United States Patent [19]
Pisoni et al.

[11] Patent Number: 5,456,039
[45] Date of Patent: Oct. 10, 1995

[54] FISHING LURE

[76] Inventors: Henry F. Pisoni, 849 Alexander St.; Victor S. DeSantis, 1600 Main St., both of Brockway, Pa. 15824

[21] Appl. No.: 265,797
[22] Filed: Jun. 27, 1994
[51] Int. Cl.$^6$ ................................................. A01K 85/00
[52] U.S. Cl. ........................ 43/42.24; 43/42.28; 43/42.36; D22/133
[58] Field of Search .................. 43/42.24, 42.26, 43/42.36, 42.28; D22/133, 132

[56] References Cited

U.S. PATENT DOCUMENTS

| | | | |
|---|---|---|---|
| 3,965,606 | 6/1976 | Bingler | 43/42.24 |
| 4,317,305 | 3/1982 | Firmin | 43/42.24 |
| 4,703,579 | 11/1987 | Kay | 43/42.24 X |
| 5,367,817 | 11/1994 | Clark | 43/42.24 X |

Primary Examiner—P. Austin Bradley
Assistant Examiner—Jeanne M. Elpel
Attorney, Agent, or Firm—Paul Bogdon

[57] ABSTRACT

A fishing lure having a flexible head section connected by a flexible shaft to a flexible tail section. A cup-shaped mid-section is formed on the forward end of the tail section and surrounds the rearward portion of the flexible shaft. The mid-section is formed of a resilient material and is shaped such that it will flex rearwardly and fold over as the lure is drawn through water above a certain speed and will return to its original shape as the speed of the lure decreases. The lure will move and oscillate as water flows along the lure and the speed of the lure through the water is increased and decreased.

8 Claims, 1 Drawing Sheet

FISHING LURE

BACKGROUND OF THE INVENTION

This invention relates to a fishing lure, and particularly to a fishing lure that moves and oscillates as it is drawn through water in a manner to attract the attention of fish.

There are many artificial fishing lures known and used for attracting and catching fish. These lures have various shapes and configurations. Some are made to appear as living creatures such as minnows, worms, snakes, and the like. Some of the known lures are designed and formed to provide relative movement of the parts as the lure is drawn through water. Certain fish sought to be caught are attracted to movement of any objects. The greater or more pronounced the movement of the object the greater the possibility of attracting the attention and interest of the particular fish. Various designs of lures have been attempted to provide desired movements of the lures in the water. Many of the previously known lures have used a number of interconnected parts for providing the desired lure movements. These lures which were somewhat complex in their designs required multiple manufacturing steps and as a result were costly to the ultimate user. Additionally, these complex lures sometimes failed to resemble living creature and as a result were not attractive to certain fish.

The fishing lure of our present invention overcomes certain of the heretofore mentioned drawbacks of previously known fishing lures. Our fishing lure is simple in its construction and design and may be formed in any shape to resemble any desired living creature. Our fishing lure is capable of movement and oscillation in a manner simulating the motion of living creatures as it is drawn through water. Because of its simple, yet unique, construction our basic fishing lure may be manufactured by as little as a single molding operation.

SUMMARY OF THE INVENTION

The fishing lure of our present invention preferably comprises: a head section and a tail section connected by a flexible shaft member allowing relative movement between the sections. A generally cup-shaped or conically shaped resilient mid-section surrounding at least the rearward section of the shaft member is secured to a forward portion of the tail section. The parts of the fishing lure are constructed and arranged such that the cup-shaped mid-section will flex rearwardly and fold over as the lure is drawn through water and will flex back to its original shape as the lure speed through the water is decreased. Drawing the lure through water thus results in induced oscillation of the mid-section and movement among the parts.

The combination of the head and tail section may be formed to resemble living creatures such as minnows, worms, shrimp, and the like, or they may be formed to have no resemblance to any living creatures. The flexible shaft connecting the head and tail section may be varied in length to obtain more or less relative movement between the sections. Each part may be formed from a different or the same material. All the parts of the basic lure may be formed from a flexible elastomeric material. The parts of our fishing lure may be formed integrally and thereafter a hook assembly and means for securing the lure to a fishing line installed.

Various other advantages, details and modifications of our present invention will become apparent as the following description of a certain preferred embodiment proceeds.

DESCRIPTION OF THE DRAWINGS

In the accompanying drawings we show a certain present preferred embodiment of our invention in which.

DESCRIPTION OF A PREFERRED EMBODIMENT

Figure 1:
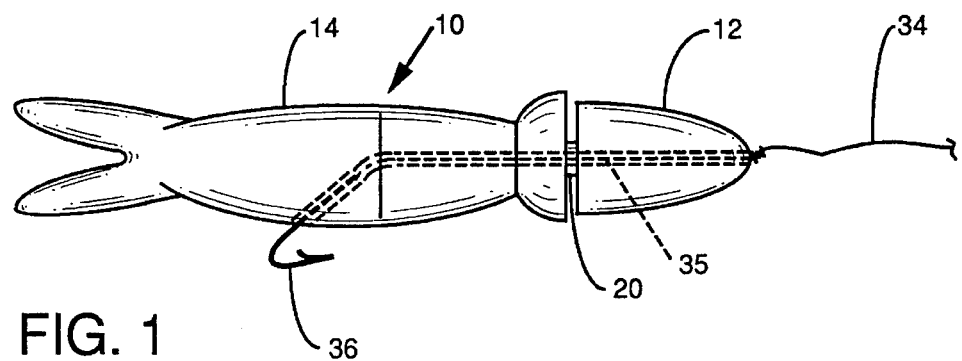
FIG. 1 is a side elevation view of a fishing lure embodying our present invention.

Referring now to the drawings there is illustrated a fishing lure 10 embodying our present invention, and resembling a bait fish such as a minnow. It is to be carefully understood, however, that our fishing lure is not limited to resembling a minnow but may be formed to resemble any desired living creature used as lures such as worms, shrimp, tadpole, crayfish, snakes, frogs or other creatures, or our lure may be formed to resemble no living creature at all. The selection of the design of our lure may be made depending on the species of fish sought to be attracted and caught using our lure.

The fishing lure 10 includes a head section 12 and a tail section 14. The rearward portion of the head section 12 is provided with generally cylindrically shaped pocket 18. A flexible shaft member 20 is disposed centrally within the pocket 18 and has one end fixed to the body of the head section 12 and the other end thereof fixed to the forward end portion of the tail section 14. The shaft member 20 will permit relative movement between the head section 12 and the tail section 14. The degree and nature of the movement may be varied as desired by varying the length of the pocket 18 and thereby varying the length of the attaching shaft member 20.

A generally conically or cup-shaped mid-section 30 is fixed to the forward end of the tail section 14 with the mid-section surrounding the rearward section of the shaft member 20. The open forward end of the mid-section 30 is positioned in a plane adjacent to the rearward end of the head section 12. The spacing of the mid-section 30 and the rearward end of the head section 12 may be varied or desired depending on the desired movement sought to be achieved between the head section 12 and tail section 14 as the lure 10 is drawn through water.

A leader 34 extends into the lure 10 through a passageway 35 formed centrally of the head section 12, shaft member 20, and tail section 14. The leader is connected with a hook assembly 36 arranged in the tail section 14 and in the passageway 35. If desired a hook may be arranged in the head section 12, and may also be formed to secure the lure 10 directly to a fishing line.

The head section 12, shaft member 20, and tail section 14, are preferably formed or molded of a suitable flexible or resilient elastomeric material such as polyvinyl chloride of the thermoplastic polymer family. Any other material may be used for the parts. Also, the head section 12 and tail section 14 may be formed from a less flexible material so long as the shaft member 20 and mid-section 30 are flexible or resilient.

Figure 2:
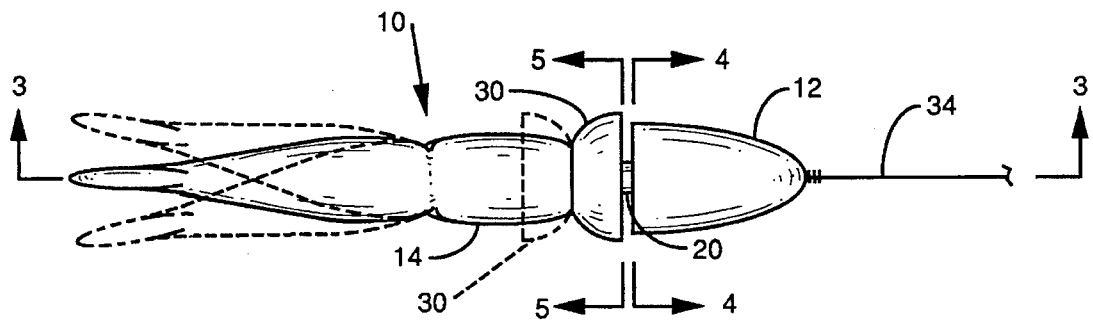
FIG. 2 is a top view of the fishing lure of FIG. 1 showing the mid-section flex rearwardly as would occur when the lure is drawn through water, and showing in phantom outline movement of the section.
Figure 3:
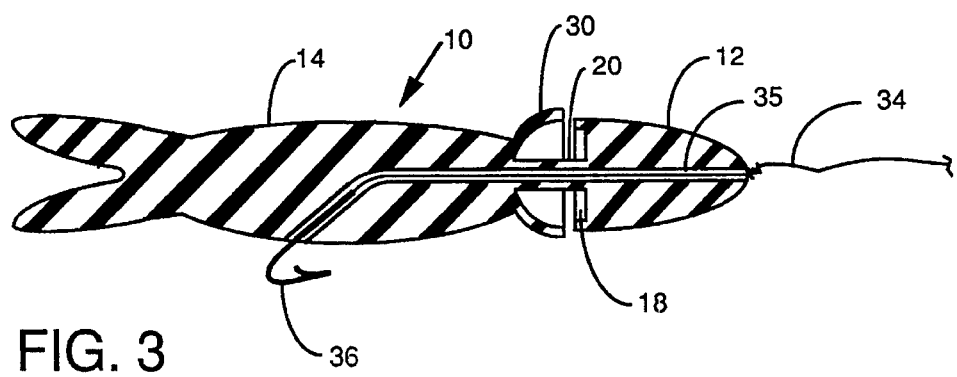
FIG. 3 is a sectional view through the fishing lure of FIG. 1 showing details of construction.
Figure 4:
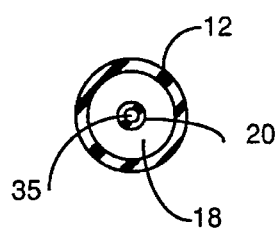
FIG. 4 is a view looking along the line IV—IV of FIG. 1.
Figure 5:
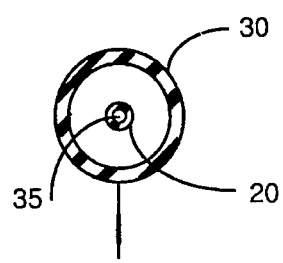
FIG. 5 is a view looking along the line V—V of FIG. 1.

As the fishing lure 10 is drawn through water the cup-shaped mid-section 30 will tend to flex rearwardly as water passes over the head section 12 and into the mid-section. The mid-section 30 will fold over as illustrated in FIG. 2 when the speed of the lure 10 in the water reaches a pre-determined magnitude. When the lure 10 is slowed in its speed through water the mid-section will flex back to its original form. The speed of the lure 10 through water above where the mid-section 30 will flex completely rearwardly may be determined through experimentation by observing the flexing of the mid-section in a container of water. The size of the mid-section 30 may be varied depending on the desired flexing at a particular speed of the lure 10 being drawn through water.

The flexing rearwardly and forwardly of the cup-shaped mid-section of the lure 10 as it is drawn through water will induce movement and oscillation to the tail section 14 of a nature not previously realized. That movement combined with the movements between the head section 12 and tail section 14 will be an attraction to certain fish.

As stated earlier herein any design may be given to the sections of the lure 10 to resemble a particular and desired living creature. The lure 10 may also be painted or formed with features designed to attract fish. Various other design changes may be made to our lure 10 as those skilled in this art would recognize. Our lure 10 is not limited to any particular shape, size, weight or form.

While we have shown and described a present preferred embodiment of this invention, it is to be distinctly understood that the invention is not limited thereto, but may be otherwise embodied within the scope of the following claims.

We claim:

1. A fishing lure comprising:

a head section having forward and rearward ends;

a tail section having forward and rearward ends;

an elongated flexible shaft member fixed at one end to a rearward end portion of said head section and the other end fixed to a forward end portion of said tail section;

a generally cup-shaped resilient mid-section fixed at its closed end to a forward end portion of said tail section and completely surrounding at least the rearward section of said shaft member; and said head section, said shaft member, said tail section, and said mid-section being constructed and arranged such that as the lure is drawn through water above a predetermined speed said mid-section will flex rearwardly and fold over and will return to its original shape as the lure is drawn through water below said pre-determined speed, whereby movement is induced to said head and tail sections.

2. The fishing lure as set forth in claim 1 wherein said head section has a pocket formed in its rearward end portion; and said shaft member extends into said pocket.

3. The fishing lure as set forth in claim 1 wherein said mid-section is integrally formed with said tail section.

4. The fishing lure as set forth in claim 1 wherein said tail section is formed of a flexible material.

5. The fishing lure as set forth in claim 4 wherein said head section is formed of a flexible material.

6. The fishing lure as set forth in claim 1 wherein said head section, said tail section, said shaft member, and said mid-section are integrally formed.

7. The fishing lure as set forth in claim 1 wherein said head section, said tail section, said shaft member, and said mid-section are formed from an elastomeric material.

8. The fishing lure as set forth in claim 1 wherein the inner dimension of the open end of said mid-section is greater that the other dimensions of the rearward end of said head section.

* * * * *